Jan. 12, 1954
B. W. BLACKMAN
2,666,123
MATERIAL CUTTING DEVICE
Filed Dec. 13, 1951
3 Sheets-Sheet 1
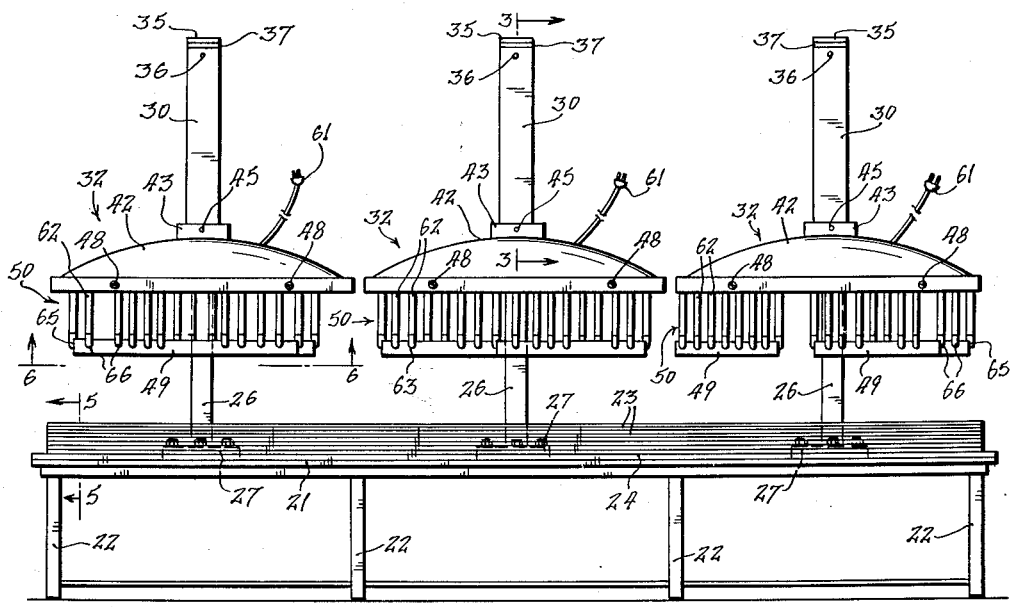
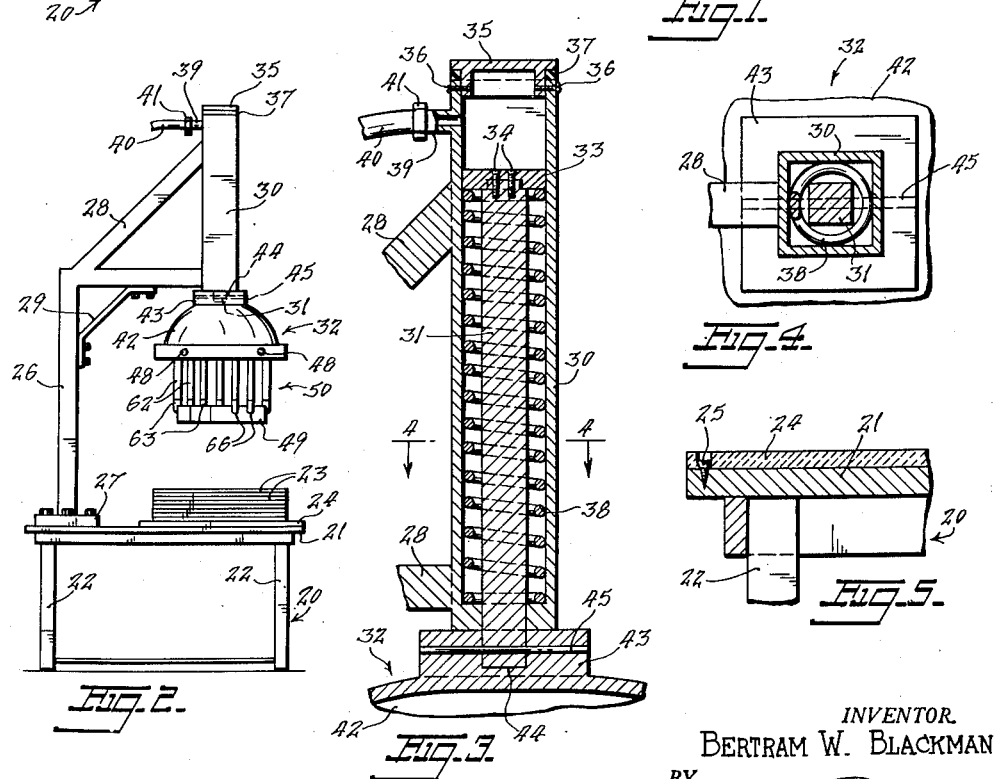
INVENTOR.
BERTRAM W. BLACKMAN
BY
ATTORNEY Jan. 12, 1954 B. W. BLACKMAN 2,666,123
MATERIAL CUTTING DEVICE
Filed Dec. 13, 1951 3 Sheets-Sheet 2
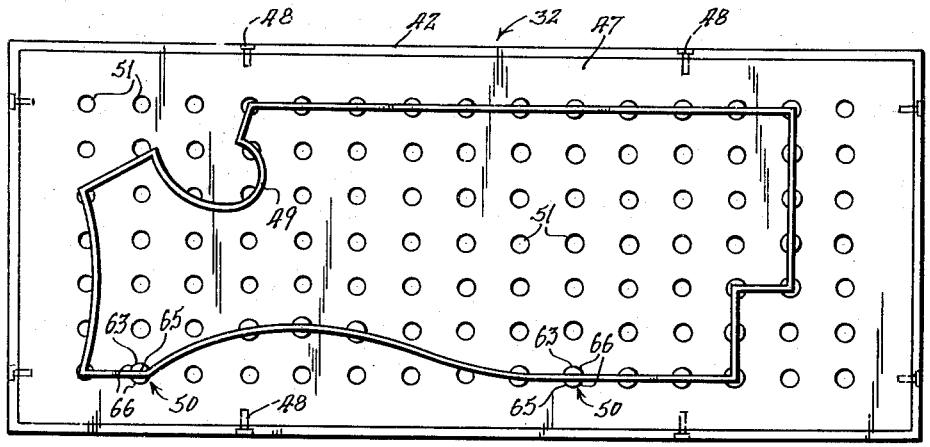
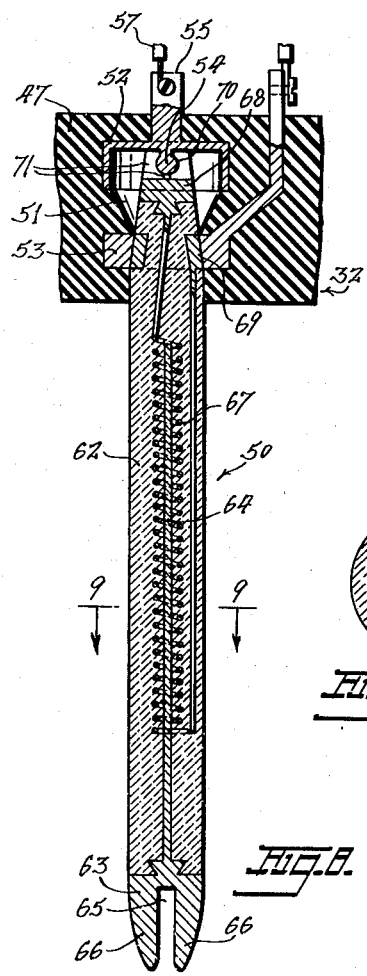
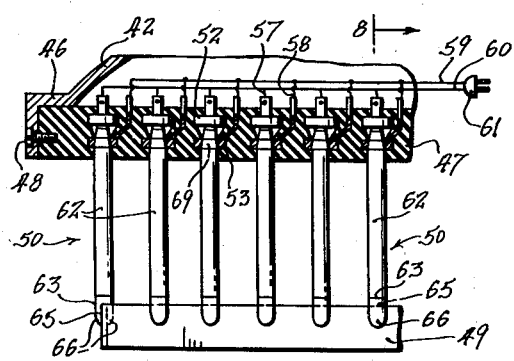
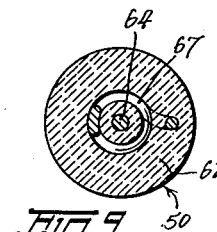
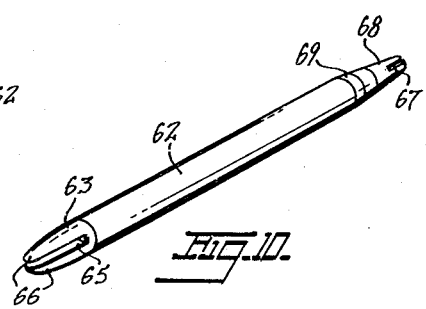
INVENTOR.
BERTRAM W. BLACKMAN
BY
ATTORNEY Jan. 12, 1954   B. W. BLACKMAN   2,666,123
MATERIAL CUTTING DEVICE
Filed Dec. 13, 1951   3 Sheets-Sheet 3
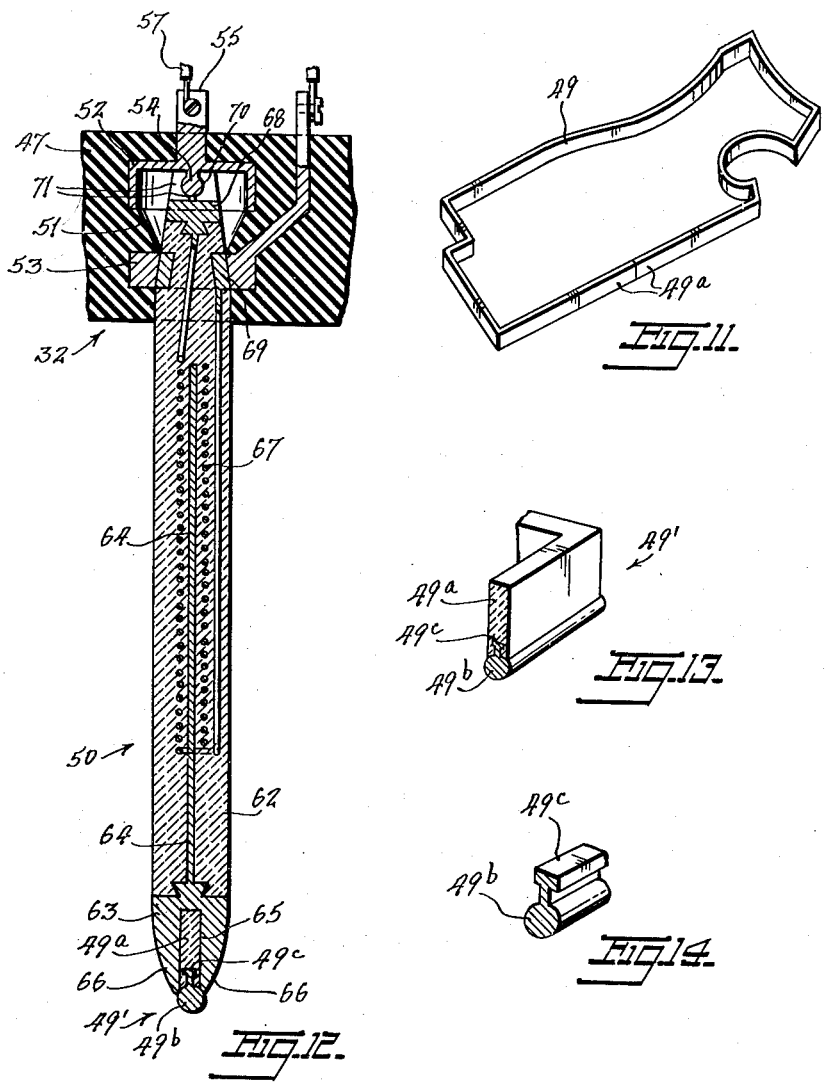
INVENTOR.
BERTRAM W. BLACKMAN
BY
ATTORNEY

Patented Jan. 12, 1954

2,666,123

UNITED STATES PATENT OFFICE 2,666,123

MATERIAL CUTTING DEVICE

Bertram W. Blackman, Great Neck, N. Y.

Application December 13, 1951, Serial No. 261,558

9 Claims. (Cl. 219—19)

This invention relates to a material cutting device.

More specifically, the present invention proposes the construction of a material cutting device having heated pattern forms for searing its way through layers of material stacked on a table in a manner to facilitate cutting the material in accordance with certain pattern outlines for making articles of clothing or any other similar articles made of cloth materials.

More specifically, the present invention proposes the construction of such a cutting device having a table upon which the layers of material are to be laid up beneath heads which are slidably supported for movement toward and away from the top of the table and upon which the heated pattern forms are mounted to sear their way through the layers of material as the heads are lowered.

Another object of the present invention proposes a novel means for removably mounting the pattern forms on the bottom faces of the movable heads in a manner so that the forms in use can be removed and interchanged with others which are to be used without requiring the use of any tools to make the change.

As a further object, the present invention proposes using vertical mounting posts provided at their bottom ends with resilient gripping tips for engagement with the pattern forms and which are constructed at their top ends to be removably inserted into complementary socket openings formed in the bottom faces of the movable heads in a manner to support the pattern forms on the heads.

Still another object of the present invention proposes the inclusion of electric heaters within the mounting posts and connected to contacts on the top ends of the posts which make electrical contact with similar contacts mounted within the movable heads in a manner to supply the required current to energize the heaters to heat the pattern forms to the required temperature to sear their way through the layers of material when the heads are lowered.

The present invention further proposes the construction of a novel cutting device which lends itself admirably to use in establishments engaged in the mass production of articles made from cloth materials as the device requires a minimum of time to set up and once set up effects a considerable saving in time to cut the layers of cloth material thus materially speeding up the mass production of the cloth articles.

It is a further object of the present invention to construct a material cutting device of the class described, which is simple and durable, which is effective for its intended purposes and which can be manufactured and sold at a reasonable cost.

On the accompanying drawings forming a material part of the present disclosure:

Fig. 1 is a front elevational view of the material cutting device constructed in accordance with the present invention.

Fig. 2 is an end elevational view looking from the left side of Fig. 1.

Fig. 3 is an enlarged partial vertical sectional view taken on the line 3—3 of Fig. 1.

Fig. 4 is a partial horizontal sectional view taken on the line 4—4 of Fig. 3.

Fig. 5 is an enlarged partial vertical sectional view of the table, per se, taken on the line 5—5 of Fig. 1.

Fig. 6 is an enlarged bottom elevational view of one of the heads looking in the direction of the line 6—6 of Fig. 1.

Fig. 7 is an enlarged detailed sectional view of a portion of one of the heads.

Fig. 8 is an enlarged partial vertical sectional view through one of the mounting posts taken on the line 8—8 of Fig. 7.

Fig. 9 is a horizontal sectional view taken on the line 9—9 of Fig. 8.

Fig. 10 is a perspective view of one of the mounting posts, per se.

Fig. 11 is a perspective view of one of the pattern forms, per se.

Fig. 12 is a view similar to Fig. 8, but illustrating the pattern form constructed in accordance with a modification of the present invention.

Fig. 13 is a perspective view of a portion of the pattern form used in the form of the invention shown in Fig. 12.

Fig. 14 is an enlarged perspective view of the wire used in the pattern form shown in Fig. 13.

The cutting device, according to the first form of the present invention shown in Figs. 1 to 11 includes a narrow elongated table 20 having a flat top 21 supported in an elevated position on suitable legs 22. Cloth material 23 to be cut in accordance with certain preformed pattern shapes, is laid up in superimposed layers on the table top 21 adjacent the front edge thereof, as shown in Figs. 1 and 2. The front portion of the table top 21 upon which the layers of cloth material 23 are laid, is covered by a sheet of refractory material 24 capable of protecting the table top from burning when the layers of material 23 have been completely seared through as will become clear as this specification proceeds. The sheet of refractory material is preferably a thin sheet of asbestos held in position by countersunk screws 25; one of which is shown in Fig. 5.

Positioned on the table top 21, beyond the rear edge of the sheet of refractory material 24, there are equally spaced brackets 26 which are spaced along the length of the table 20. At their bottom ends, the brackets 26 are formed with enlarged foot portions 27 bolted to the table top 21 beyond the rear edge of the sheet of refractory material, see Fig. 2. At their top ends, the brackets 26 continue into forwardly extending arm formations 28 which overhang the sheet of refractory material 24 and the layers of cloth material 23 stacked thereon. The right angle juncture of the main body of the brackets 26 and the arm formations 28 are reinforced by braces 29.

Secured to the free end of each of the arm formations 28, there is a vertically extended cylinder 30 supporting a piston rod 31 for vertical sliding movement. The bottom ends of the piston rods 31 are extended from the bottom ends of the cylinders 30 and having heads 32 mounted thereon. Mounted on the top ends of the piston rods 31 within the cylinders 30 there are pistons 33. The pistons 33 are secured in position by several bolts 34. The cylinders 30, the piston rods 31 and the pistons 33 are square in cross-section, as can be best determined from Fig. 4, so that the heads 32 cannot turn relative to the cylinders 30 while at the same time having freedom of vertical sliding movement relative thereto.

The top ends of the cylinders 30 are open except for caps 35 which are fitted into the open tops and held in position by removable screws 36. The engagement of the caps 35 with the top ends of the cylinders 30 is sealed by compressible gaskets 37 of rubber or like material.

Encircling the piston rod 31 within the cylinder 30, there is an expansion spring 38. The spring 38 operates between the bottom end of the cylinder 30 and the bottom face of the respective piston 33 maintaining the piston rod and the respective head 32 in the raised position shown in Figs. 1 to 3. Downward movements of the heads 32 are controlled by fluid under pressure introduced through an externally threaded nipple 39, see Fig. 3, formed on the rear side of each of the cylinders 30 above the arm formations 28. One end of a flexible tube 40 is connected to each of the nipples 39 by a union 41. The other ends of the tubes 40 are connected to a manually controllable source of fluid under pressure not shown, for at will feeding fluid under pressure into the top of any one of the cylinders 30. The fluid under pressure will act against the top face of the pistons 33 and lower the heads 32 against the action of the expansion springs 38. When the fluid under pressure is released the springs 38 will function to raise the piston rods 31 and attached heads 32 causing the fluid to flow out of the nipples 39 and back to the source.

Each of the heads 32 is alike in construction and each has a hollow casing 42 of metal or similar material which is open at its bottom. The top of each casing 42 is formed with an upstanding boss 43 formed with an upwardly opening recess 44 into which the bottom end of the respective piston rod 31 is received. The boss 43 and the respective piston rod 31 are removably joined together by an elongated pin 45 passed through aligned holes formed in the parts, as best shown in Fig. 3.

Snugly fitted into the open bottom of each of the casings 42 and against an internal shoulder 46 formed within the casings, there are plates 47 of insulation material capable of withstanding heat. The plates 47 are molded of any desired material capable of withstanding the heat generated by the device and good results have been obtained from the ceramic materials as porcelain. The plates 47 are removably secured in position by screws 48, see Figs. 6 and 7, passed in from the sides of the casings 41 and threaded into the material of the plates.

Provided for mounting on each of the heads 32, there is one or more pattern forms 49. As best shown in Fig. 11, the pattern forms 49 are formed as a continuous outline being bent from an elongated strip of flat metal wire which can be safely heated to a high temperature to have a searing effect on the layers of cloth material 23 laid up on the table top 21. The adjacent ends 49ª of the strip of material used for forming the pattern form 49 are joined together by welding or the like to maintain the smooth continuity of the pattern form.

The pattern forms 49 are supported on the bottom face of the heads 32 by means of removable mounting posts 50, which have their top ends fitted into selected socket openings 51 formed in the bottom faces of the plates 47 of the heads 32. Molded into the material of the plates 47 concentric with the axis of the socket openings 51, there is a cap contact 52 and a ring contact 53 for each of the socket openings. The contacts 52 and 53 are arranged one above the other on the axes of the socket openings 51 and are formed of a conductive material. The cap contact 52 is open at its bottom and formed with a concentric depending headed post 54 for a purpose which will become clear as this description proceeds.

Extended upward from the cap contacts 52 there are extensions 55 exposed beyond the top face of the plate 47. Likewise, the ring contacts 53 have extensions 56 extended upward beyond the top face of the plate 47. The extensions 55 and 56 are connected by leads 57 and 58, respectively, in parallel to main leads 59 and 60, see particularly Fig. 7. The ends of the main leads 59 and 60 are extended from the casings 42 of the heads 32 and provided with the usual plugs 61 for insertion into the usual outlet receptacles for supplying the required electric current for the cutting device. From Fig. 7, it is apparent that the pairs of contacts 52 and 53 are connected in parallel with the leads 59 and 60 so that each pair of contacts may operate independently of the other pairs.

The interiors of the contact rings 53 are tapered to have their greatest dimension at their bottom ends, as best shown in Fig. 8.

The mounting posts 50 are all alike in formation and each includes a main body portion 62 formed of a dielectric, refractory material—porcelain or the like. Molded into position on the bottom end of each of the main body portions 62 there is a gripping tip 63 formed of a metal which readily heats to a high temperature. Extending upward from each of the gripping tips 63 there is a rod 64. The rods 64 are formed integrally with the gripping tips 63 and are extended concentrically through the main body portions 62 nearly to the top ends thereof, for both reinforcing the main body portions 62 and for conducting heat to the gripping tips 63. Extended inward from the bottom ends of the gripping tips 63, there are slots 64 for receiving the pattern forms 49. The slots 64 divide the bottom end portions of the gripping tips 63 into spaced tines 66 which are converged downward and inward, see Fig. 8. The arrangement of the tines 66 requires that the pattern forms 49 be forced into position between the tines 66 so that the tips 63 will frictionally grip and maintain the pattern forms 49 in position.

Molded into the material of the main body portions 62 of the mounting posts 50 to surround the rods 64 without touching the same, there are resistance windings or heater coils 67. The coils 67 are insulated electrically from the rods 64 by the material of the main body portions 62; however, the close proximity of the heater coils to the rods 64 will cause those rods to conduct the heat to the gripper tips 63 and thence to the pattern forms 49 supported by the mounting posts 50.

The top end portions of the mounting posts 50 are tapered conforming to the taper of the interiors of the conductor rings 53. Molded into the tapered top end portions of the mounting posts 50, there are head contacts 68 and ring contacts 69. The contacts 68 and 69 are made of a conductive metal and when the tapered top end portions of the mounting posts 50 are inserted fully into the socket openings 51, the head contacts 68 make electrical contact with the cap contacts 52 and the ring contacts 69 make electrical contact with the ring contacts 53, see Fig. 8. The outer peripheries of the ring contacts 69 are tapered to have a snug fit in the tapered inner formations of the ring contacts 53.

Means is provided for releasably joining the head contacts 68 to the cap contacts 52 to releasably maintain the mounting posts 50 in position within the socket openings 51 while at the same time permitting free turning of the mounting posts 50 on their vertical axes to properly locate the slots 65 in the bottom ends of the posts for engagement with the pattern forms 49. The releasable mounting is accomplished by forming the top ends of the head contacts 68 with sockets 70 conformed to the shape of the headed posts 54 of the cap contacts 52. Extended inward from the top ends of the head contacts 68 there are slots 71, see Figs. 8 and 10, which render the top ends of the head contacts 68 sufficiently resilient to spread as the headed posts 54 are forced into or pulled out of the sockets 70. When the headed posts 54 are in position in the sockets 70, as shown in Fig. 8, it is appreciated that the mounting posts 50 have freedom of rotative movement on their vertical axes without in any way interfering with the electrical engagement of the pairs of contacts 52 and 68 and 53 and 69.

One end of the heating coil 67 is secured to the head contact 68 and the other end is connected to the ring contact 69, see Fig. 8.

For purposes of clarity of illustration on the drawing, the number of socket openings 51 on the bottom face of the heads 32 has been reduced in number. In actual practice the number of socket openings will be increased with the socket openings being spaced from each other about one inch or one and one-half inches in all directions.

The operation of the cutting device of the present invention is as follows:

The desired number of layers of the cloth material 23 are first laid up on the table top 21 beneath the heads 32 and the desired pattern forms 49 are selected. The selected pattern forms 49 are mounted on the heads 32 using a mounting post 50 wherever portions of the pattern forms 49 pass beneath the socket openings 51 of the heads 32.

After the pattern forms 49 are mounted in position, the plugs 61 are inserted into the outlet receptacles to supply the electric current required to energize the heater coils 67 of the mounting posts 50. A period of time is permitted to elapse of sufficient duration to thoroughly heat the pattern forms 49 to a temperature to sear the cloth material. When the pattern forms have reached the desired temperature, the heads 32 are lowered one after the other bringing the pattern forms into contact with the layers of cloth material 23 which will sear their way through the layers cutting the cloth material to the desired outlines. Downward movement of the heads 32 will be arrested by engagement of the pattern forms 49 with the sheet of refractory material 24 which covers and protects the table top 21 against damage from the hot pattern forms. After the heads have been completely lowered, the supply of fluid to the cylinders 30 is cut off allowing the springs 36 to raise the heads 32 to their starting positions withdrawing the pattern forms 49 from the layers of cloth material. It is appreciated, of course, that the mounting posts 50 must be made sufficiently long to permit the pattern forms 49 to pass completely through the layers of cloth material 23 before the heads 32 engage the topmost layer of the stack of cloth material.

The modification of the invention shown in Figs. 12 to 14 illustrates a modified construction of the pattern form for use with the cutting device. The modified pattern form 49' is of two part construction consisting of a main body portion 49$^a$ and a searing portion 49$^b$. The searing portion 49$^b$ is bent from an elongated piece of metal wire capable of being heated to a high temperature and has its adjacent ends welded together. The metal wire used for forming the searing portion 49$^b$ is shaped to include an upstanding rib 49$^c$ of irregular formation, as best shown in Fig. 14. After the searing portion 49$^b$ has been bent to shape, the main body portion 49$^a$ is molded in position on the upstanding rib 49$^c$ of a refractory material capable of withstanding high temperatures so that the major part of the pattern form 49' remains cool when in operation.

The main body portion 49$^a$ of the pattern form 49' has a thickness less than the diameter of the searing portion 49$^b$ so that the sides of the searing portion project beyond the sides of the main body portion. However, the main body portion 49$^a$ has a thickness to be frictionally received within the slot 65 of the gripping tip 63 of the mounting posts 50 as shown in Fig. 12. The height of the main body portion 49$^a$ is such that when the pattern form 49' is fully inserted into the gripping tip 63, the tip ends of the tines 66 will contact the sides of the searing portion 49$^b$ and conduct the heat thereto from the heater coil 67 to heat the searing portion 49$^b$ to sear its way through the stacked layers of cloth material 23 when the heads 32 are lowered.

In all other respects, the form of the invention shown in Figs. 12 to 14 is similar to that described in connection with Figs. 1 to 11 and like reference numerals are used to identify like parts.

From the foregoing description, it is apparent that the present invention proposes a novel arrangement of cutting device for cutting cloth layers to the desired pattern outlines by searing through the material. The chief advantage arising from the use of the present device is the great speed with which a great number of forms can be cut out so as to materially speed up the mass production of articles of clothing and other similar articles made of cloth material. The pattern forms 49 are completely interchangeable with a minimum of effort and at a great saving in time as no tools are required for making the interchange.

While I have illustrated and described the preferred embodiments of my invention, it is to be understood that I do not limit myself to the precise constructions herein disclosed and the right is reserved to all changes and modifications coming within the scope of the invention as set forth in the appended claims.

Having thus described my invention, what I claim as new and desire to secure by United States Letters Patent is:

1. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings.

2. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings, said spaced contacts of said socket openings being connected together in parallel for connection to a source of electric current.

3. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings, one of said contacts of said first-mentioned spaced contacts being a head contact on said mounting post, one of said contacts of said second-mentioned spaced contacts being a cap contact opening downward to receive said head contact, and means releasably joining said head contact to said cap contact to retain the top end portion of said mounting post in position in said socket opening while leaving it free for rotation on its axis.

4. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings, one of said contacts of said first-mentioned spaced contacts being a head contact on said mounting post, one of said contacts of said second-mentioned spaced contacts being a cap contact opening downward to receive said head contact, and means releasably joining said head contact to said cap contact to retain the top end portion of said mounting post in position in said socket opening while leaving it free for rotation on its axis, and joining means comprising a headed post depended from said cap contact concentric therewith, and a complementary socket formed in the top end of said head contact for receiving said headed post.

5. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material, covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings, one of said contacts of said first-mentioned spaced contacts being a head contact on said mounting post, one of said contacts of said second-mentioned spaced contacts being a cap contact opening downward to receive said head contact, and means releasably joining said head contact to said cap contact to retain the top end portion of said mounting post in position in said socket opening while leaving it free for rotation on its axis, said joining means comprising a headed post depended from said cap contact concentric therewith, and a complementary socket formed in the top end of said head contact for receiving said headed post, said head contact having slots extended in from its free end and spaced about said socket so that said headed post can be inserted into and withdrawn from said socket.

6. A material cutting device, comprising a table adapted to have layers of material to be cut to conform to certain pattern outlines laid up thereon, a support bracket mounted on said table and having an arm formation disposed to overhang the material laid up on said table, a head slidably supported on said arm formation for movement toward and away from said table, means for lowering said head toward said table, a metallic pattern form, means removably supporting said pattern form on the bottom face of said head to move therewith, and means for heating said pattern form to sear through the layers of material laid up on said table when said head is lowered toward said table, said table having a table top upon which the layers of material are to be laid up, and a sheet of refractive material covering said table top beneath the laid up layers of cloth material, said head having a hollow casing having an open bottom, and a plate closing the open bottom of said hollow casing and from which said pattern form is supported, said removable supporting means comprising vertically elongated mounting posts, each of said mounting posts having a main elongated body portion, said plate having socket openings into which the top ends of the main elongated body portions can be selectively engaged, and gripping tips mounted on the bottom ends of said body portions for mounting said pattern forms, said heating means comprising a heating coil molded into the material of said main body portion, said spaced contacts molded into the material of the top end of said main body portion and connected to the ends of said coil, spaced contacts molded into said plate coaxially with each of said socket openings for contacting said first contacts when said mounting posts are inserted at their top ends into said socket openings, and a rod extended from said gripping tip and projected concentrically upward through said heating coil for reinforcing said body portion and for conducting heat to said pattern form.

7. In a material cutting device including a table for material, and a support bracket including a slidable head and pattern form; said head including insulated plates, a mounting post secured in said plates, contact means in vertical spaced relation in said plates and extending upwardly therefrom to main lead means for independent operation, resistance windings in said posts to conduct heat to the pattern forms, and gripper means on said post to engage said pattern form, said contact means are cap contacts received within said plates and ring contacts engaging said post.

8. The combination of claim 7 wherein a head contact electrically contacts the cap member and a second ring contact engages said first ring member, and means to releasably join said head and cap contacts.

9. In a material cutting device including a table for material, and a support bracket including a slidable head and pattern form; said head including insulated plates, a mounting post secured in said plates, contact means in vertical spaced relation in said plates and extending upwardly therefrom to main lead means for independent operation, resistance windings in said posts to conduct heat to the pattern forms, and gripper means on said post to engage said pattern form, the pattern includes a beaded portion extending beyond the gripper means.

BERTRAM W. BLACKMAN.

References Cited in the file of this patent

UNITED STATES PATENTS

| Number | Name | Date |
|---|---|---|
| 588,940 | Angell | Aug. 31, 1897 |
| 685,833 | Grall | Nov. 5, 1901 |
| 1,447,730 | Post | Mar. 6, 1923 |
| 1,992,250 | Stacey | Feb. 26, 1935 |
| 2,552,353 | Troth et al. | May 8, 1951 |
| 2,561,050 | Charron et al. | July 17, 1951 |
| 2,569,807 | Elstad | Oct. 2, 1951 |